(12) United States Patent
Sakai et al.

(10) Patent No.: US 9,555,793 B2
(45) Date of Patent: Jan. 31, 2017

(54) VEHICLE CONTROL APPARATUS

(71) Applicants: Yuu Sakai, Toyota (JP); Fumichika Shimose, Toyota (JP); Junichi Morimura, Suntoh-gun (JP); Keita Awaji, Kobe (JP)

(72) Inventors: Yuu Sakai, Toyota (JP); Fumichika Shimose, Toyota (JP); Junichi Morimura, Suntoh-gun (JP); Keita Awaji, Kobe (JP)

(73) Assignees: TOYOTA JIDOSHA KABUSHIKI KAISHA, Toyota-shi (JP); FUJITSU TEN LIMITED, Kobe-shi (JP)

( * ) Notice: Subject to any disclaimer, the term of this patent is extended or adjusted under 35 U.S.C. 154(b) by 92 days.

(21) Appl. No.: 14/700,282

(22) Filed: Apr. 30, 2015

(65) Prior Publication Data

US 2015/0360699 A1 Dec. 17, 2015

(30) Foreign Application Priority Data

Jun. 11, 2014 (JP) .................................. 2014-120864

(51) Int. Cl.
*B60W 10/06* (2006.01)
*B60W 10/184* (2012.01)
(Continued)

(52) U.S. Cl.
CPC ............... *B60W 10/06* (2013.01); *B60T 13/52* (2013.01); *B60T 17/02* (2013.01); *B60W 10/184* (2013.01);
(Continued)

(58) Field of Classification Search
None
See application file for complete search history.

(56) References Cited

U.S. PATENT DOCUMENTS 5,332,056 A * 7/1994 Niibe ................. B60K 31/0008
180/169
6,951,199 B2 * 10/2005 Suzuki ..................... B60T 13/46
123/339.11
(Continued)

FOREIGN PATENT DOCUMENTS

| JP | 2011-122519 | 6/2011 |
| JP | 2012-230564 | 11/2012 |
| JP | 2014-070531 | 4/2014 |

*Primary Examiner* — Russell Frejd
(74) *Attorney, Agent, or Firm* — Oblon, McClelland, Maier & Neustadt, L.L.P.

(57) ABSTRACT

A vehicle control apparatus assists a braking operation by using negative pressure in a negative pressure chamber generated by rotation of an internal combustion engine, automatically stops or restarts the engine if a first or second condition is satisfied, respectively. The apparatus determines whether a braking operation is performed, detects the rotational speed of the engine and the negative pressure in the negative pressure chamber using a negative pressure sensor. When a state has continued over a predetermined time while no braking operation has been detected, and the rotational speed has been over a threshold, the apparatus temporarily determine whether the sensor is abnormal, based on the negative pressure. When the sensor has been temporarily determined abnormal for a predetermined number of times, the abnormality is certainly determined to inhibit automatic stopping of the engine. The predetermined time may be changed depending whether the state has continued.

7 Claims, 3 Drawing Sheets

(51) Int. Cl.
*B60W 30/18* (2012.01)
*B60T 13/52* (2006.01)
*B60T 17/02* (2006.01)
*F02N 11/08* (2006.01)
*F02D 41/22* (2006.01)
*B60W 50/02* (2012.01)
*F02N 11/10* (2006.01)

(52) U.S. Cl.
CPC ...... *B60W 30/18018* (2013.01); *F02D 41/222* (2013.01); *F02N 11/084* (2013.01); *F02N 11/0825* (2013.01); *B60W 2050/0215* (2013.01); *B60W 2510/0638* (2013.01); *B60W 2510/0671* (2013.01); *F02D 2200/0406* (2013.01); *F02D 2200/101* (2013.01); *F02D 2250/41* (2013.01); *F02N 11/108* (2013.01); *F02N 2200/0807* (2013.01); *F02N 2200/102* (2013.01); *F02N 2300/2011* (2013.01)

(56) References Cited

U.S. PATENT DOCUMENTS

| | | | |
|---|---|---|---|
| 2008/0264059 A1* | 10/2008 | Hirooka | B60T 13/52 60/547.1 |
| 2012/0278734 A1 | 11/2012 | Ishizuka et al. | |
| 2016/0169139 A1* | 6/2016 | Kato | B60T 8/885 123/179.4 |
| 2016/0171792 A1* | 6/2016 | Shimose | F02D 41/222 701/114 |
| 2016/0185333 A1* | 6/2016 | Kakehi | B60T 17/221 701/112 |

* cited by examiner

VEHICLE CONTROL APPARATUS

FIELD

The disclosures herein generally relate to a vehicle control apparatus, especially relate to a vehicle control apparatus that assists a braking operation of a driver by using negative pressure in a negative pressure chamber generated depending on rotation of an internal combustion engine. The vehicle control apparatus automatically stops the internal combustion engine when a first condition is satisfied, and after the automatic stopping, automatically starts the internal combustion engine when a second condition is satisfied.

BACKGROUND

Conventionally, a vehicle control apparatus has been known that inhibits automatic stopping of an internal combustion engine when an abnormality occurs in a negative pressure sensor (see, for example, Patent Document 1). A vehicle having such a control apparatus built in includes a brake booster that assists a braking operation of a driver by using negative pressure in a negative pressure chamber, generated depending on rotation of an internal combustion engine. Also, in this vehicle, when a predetermined stopping condition is satisfied, the internal combustion engine automatically stops, and after the automatic stopping, when a predetermined restart condition is satisfied, the internal combustion engine automatically starts.

The control apparatus includes a negative pressure sensor that outputs a signal depending on the negative pressure in the negative pressure chamber, and detects the negative pressure in the negative pressure chamber based on the output signal from the negative pressure sensor. Then, based on a detected result of the negative pressure, the control apparatus determines whether an abnormality occurs in the negative pressure sensor. Specifically, it determines that an abnormality occurs in the negative pressure sensor if a state continues for a predetermined time or longer during which the output signal of the negative pressure sensor is out of a desired normal range. As a result, if determining that an abnormality occurs in the negative pressure sensor, the control apparatus inhibits the automatic stopping of the internal combustion engine, and automatically starts the internal combustion engine.

RELATED-ART DOCUMENTS

Patent Documents

[Patent Document 1] Japanese Laid-open Patent Publication No. 2011-122519

Incidentally, while outputting the signal that changes depending on the negative pressure, the negative pressure sensor may be disturbed by an abnormality due to a deviation such that a gain shift or an offset shift is generated, which could be caused by a temperature characteristic or a change over the years. However, the above control apparatus described in Patent Document 1 cannot determine that an abnormality occurs until reaching a state where the output signal of the negative pressure sensor is out of the desired normal range. Therefore, if the output signal of the negative pressure sensor has a comparatively small gain shift or offset shift that is contained within the desired normal range, the control apparatus cannot detect the abnormality due to a deviation of the negative pressure sensor as an abnormality of the sensor.

Also, an abnormality of the negative pressure sensor is certainly determined when the abnormality determination is performed multiple times in general. However, in such an abnormality determination method, if each abnormality determination is always performed after a fixed time has passed since the previous abnormality determination, regardless of whether the negative pressure in the negative pressure chamber is dissipated or maintained, then, an inconvenience may arise as follows. Specifically, if the negative pressure has been dissipated in the negative pressure chamber during the fixed time, the method may execute an abnormality determination of the negative pressure sensor, even though the negative pressure has not yet recovered in the negative pressure chamber. This may result in a situation where the abnormality determination cannot be precisely executed. Also, if the negative pressure has not been dissipated in the negative pressure chamber throughout the fixed time, the method executes an abnormality determination after having waited for a long time since the previous abnormality determination, even though the negative pressure is sufficiently maintained in the negative pressure chamber. This may result in a situation where it takes a long time to determine an abnormality in the negative pressure sensor.

In view of the above, at least one embodiment of the present invention has an object to provide a vehicle control apparatus that can realize a sure determination of an abnormality in the negative pressure sensor as early as possible while precisely executing each abnormality determination in the negative pressure sensor.

SUMMARY

According to at least one embodiment of the present invention, a vehicle control apparatus includes a negative pressure chamber in which a negative pressure is generated depending on rotation of an internal combustion engine; a braking operation assist unit configured to assist a braking operation of a driver by using the negative pressure in the negative pressure chamber; and an automatic stop and start unit configured to have the internal combustion engine automatically stop when a first condition is satisfied, and after the automatic stopping, to have the internal combustion engine automatically start when a second condition is satisfied. The vehicle control apparatus further includes a braking operation detection unit configured to determine whether a braking operation of the vehicle driver is not performed; a rotational speed detection unit configured to detect a rotational speed of the internal combustion engine; a negative pressure detection unit configured to detect the negative pressure in the negative pressure chamber, based on an output signal from a negative pressure sensor outputting a signal depending on the negative pressure generated in the negative pressure chamber; a temporary determination unit configured to temporarily determine whether the negative pressure sensor is in an abnormal state, based on the negative pressure in the negative pressure chamber detected by the negative pressure detection unit, when a state has continued for a predetermined time or longer during which the braking operation has not been detected by the braking operation detection unit, and the rotational speed of the internal combustion engine detected by the rotational speed detection unit has been greater than or equal to a threshold; an abnormality determination unit configured to certainly determine that the negative pressure sensor is in, the abnormal state when the negative pressure sensor has been temporarily determined to be in the abnormal state by the temporary determination unit for a predetermined number of times; an automatic stopping inhibition unit configured to inhibit the automatic stopping of the internal combustion engine by the automatic stop and start unit when the negative pressure sensor is determined to be in the abnormal state by the abnormality determination unit; and a time change unit configured, after the negative pressure sensor has been temporarily determined to be in the abnormal state by the temporary determination unit, to change the predetermined time for a next time used for temporarily determining whether the negative pressure sensor is in an abnormal state by the temporary determination unit, depending on whether the state has continued.

According to at least one embodiment of the present invention, it is possible to realize a sure determination of an abnormality in the negative pressure sensor as early as possible while precisely executing each abnormality determination in the negative pressure sensor.

DESCRIPTION OF EMBODIMENTS

In the following, embodiments of a vehicle control apparatus will be described according to the present invention with reference to the drawings.

Figure 1:
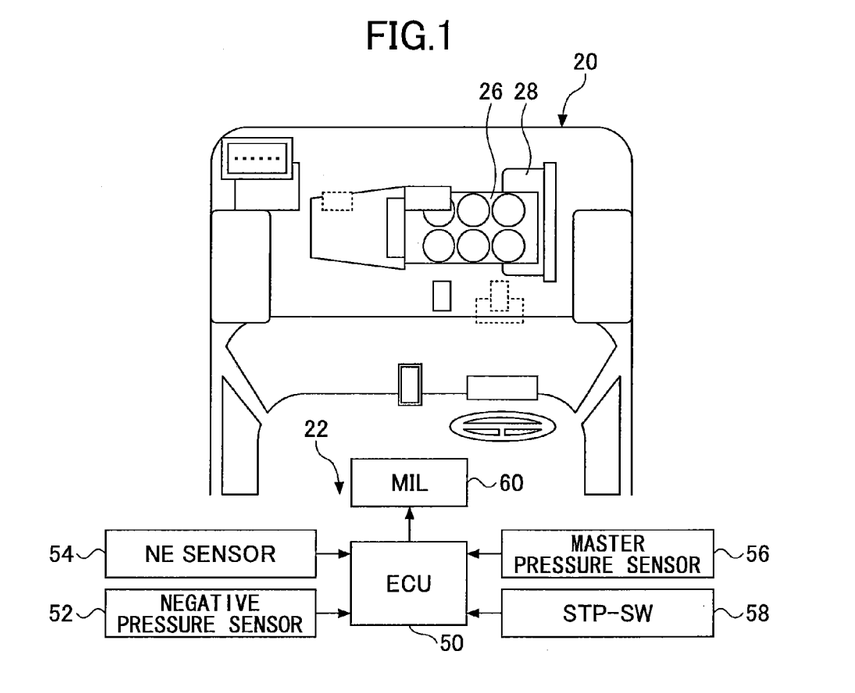
FIG. 1 is a configuration diagram of a vehicle and its control apparatus according to an embodiment the present invention.

FIG. 1 illustrates a configuration diagram of a vehicle 20 and its control apparatus 22 according to an embodiment the present invention. Also, FIG. 2 illustrates a hardware configuration diagram of a brake system 24 built in the vehicle 20 according to the present embodiment.

Figure 2:
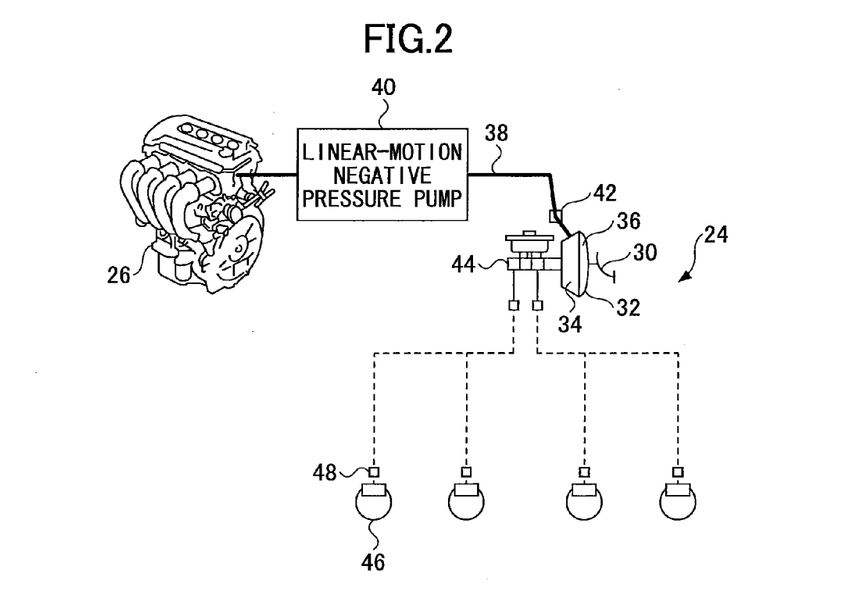
FIG. 2 is a hardware configuration diagram of a brake system built in a vehicle according to the embodiment.

As shown in FIG. 1 and FIG. 2, the vehicle 20 includes the brake system 24 and an internal combustion engine 26. The internal combustion engine 26 is a heat engine that obtains power to move the vehicle by explosive combustion of fuel. The internal combustion engine 26 may be a gasoline engine, or may be a diesel engine. The internal combustion engine 26 can be started by a starter 28 that is driven by electric power supplied from an in-vehicle battery.

The brake system 24 includes a brake pedal 30 and a brake booster 32. The brake pedal 30 is operated by a driver for braking the vehicle 20. The driver increases a pedaling operation force or an amount of stepping on the pedal to increase the brake force for the vehicle 20; or decreases the pedaling operation force or the amount of stepping on the pedal in a stepped-on state to decrease the brake force of the vehicle 20. The brake pedal 30 is coupled with the brake booster 32.

The brake booster 32 includes in its insides a negative pressure chamber 34 and a pressure change chamber 36 that are separately formed by a diaphragm. The negative pressure chamber 34 is connected with a linear-motion negative pressure pump 40 via a negative pressure tube 38. Halfway through the negative pressure tube 38, a check valve 42 is provided, which is a one-way valve, and allows airflow to go through only from the negative pressure chamber 34 side to the linear-motion negative pressure pump 40 side. The check valve 42 opens when pressure on the negative pressure chamber 34 side of the negative pressure tube 38 is higher than pressure on the linear-motion negative pressure pump 40 side.

The linear-motion negative pressure pump 40 is a pump that operates depending on rotation of the internal combustion engine 26, to introduce negative pressure, which is lower than atmospheric pressure, into the negative pressure tube 38. Note that, in the following, the negative pressure is represented by a value relative to the atmospheric pressure as a reference. Stating that "the negative pressure is great" means that the pressure is on the side close to zero [kPa] (vacuum pressure), and stating that "the negative pressure is small" means that the pressure is on the side close to the atmospheric pressure. Stating that "the negative pressure rises" means that the pressure changes closer to the zero side, and stating that "the negative pressure reduces" means that the pressure changes closer to the atmospheric pressure side.

The linear-motion negative pressure pump 40 is connected with a cam of the internal combustion engine 26, rotates at a half rotational speed of the rotational speed of the internal combustion engine 26, to introduce the negative pressure into the negative pressure tube 38. The negative pressure introduced into the negative pressure tube 38 is supplied to the negative pressure chamber 34. In the negative pressure chamber 34, the negative pressure is generated depending on the rotation of the internal combustion engine 26. The linear-motion negative pressure pump 40 has a characteristic that the negative pressure can be generated that is greater than or equal to a predetermined level (specifically, in the neighborhood of zero [kPa]), when a state has continued for a predetermined time or longer during which the rotational speed of the internal combustion engine 26 has been greater than or equal to a predetermined value.

When a pedaling operation is not performed on the brake pedal 30, the negative pressure in the negative pressure chamber 34 is introduced into the pressure change chamber 36 of the brake booster 32. In this case, not much pressure difference is generated between the pressure change chamber 36 and the negative pressure chamber 34. On the other hand, when a pedaling operation is performed on the brake pedal 30, the atmosphere is introduced into the pressure change chamber 36 depending on the brake pedaling force on the brake pedal 30. In this case, a pressure difference is generated between the pressure change chamber 36 and the negative pressure chamber 34 depending on the brake pedaling force. This pressure difference operates as an assist force that has a predetermined boost ratio with respect to the brake pedaling force on the brake pedal 30. Therefore, when a pedaling operation is performed on the brake pedal 30 while the internal combustion engine 26 rotates, the brake booster 32 generates the assist force that assists the brake pedaling force of the driver operating on the brake booster 32, using the negative pressure in the negative pressure chamber 34.

The brake booster 32 is coupled with the master cylinder 44 that includes a hydraulic pressure chamber being filled with a brake oil. In the hydraulic pressure chamber of the master cylinder 44, master cylinder pressure is generated depending on a resultant force of the brake pedaling force and the assist force of the brake booster 32. The master cylinder 44 is connected with wheel cylinders 48 that are provided for respective wheels 46. The wheel cylinders 48 provide brake force to the respective wheels 46 depending on the master cylinder pressure of the master cylinder 44.

The control apparatus 22 built in the vehicle 20 includes an electronic control unit (ECU) 50 that is configured mainly with a microcomputer. The ECU 50 is electrically connected with units in the internal combustion engine 26, including actuators such as an injector for fuel injection, a fuel pump, and a starter 28. The ECU 50 controls driving the actuators of the internal combustion engine 26, and driving the starter 28.

Also, if a predetermined stopping condition is satisfied, the ECU 50 can automatically stop the internal combustion engine 26, and after the automatic stopping of the internal combustion engine 26, if a predetermined restart condition is satisfied, it can control automatic starting (restarting) of the internal combustion engine 26. In the following, the control is referred to as the stop-and-start (S&S) control. Namely, the vehicle 20 is an idling stop vehicle that executes the S&S control. The S&S control can improve the fuel efficiency of the vehicle 20.

The predetermined stopping condition in the S&S control is that the vehicle decelerates (for example, the vehicle speed reduces to a predetermined vehicle speed or lower; or the deceleration of the vehicle is greater than or equal to a predetermined deceleration), which may take place when the driver performs a pedaling operation on the brake pedal 30 for braking, after the internal combustion engine 26 has been started to make the vehicle 20 start traveling. Also, the predetermined restart condition includes that, after the S&S control has started, a relaxing operation is performed on the brake pedal; an acceleration operation is performed; the electric load in the vehicle becomes greater than or equal to a predetermined value; and the like.

Also, the control apparatus 22 includes a negative pressure sensor 52 that is connected with the ECU 50. The negative pressure sensor 52 is disposed in the negative pressure chamber 34 of the brake booster 32. The negative pressure sensor 52 outputs a signal depending on the negative pressure being generated in the negative pressure chamber 34. The negative pressure sensor 52 is a sensor to monitor the negative pressure in the negative pressure chamber 34 of the brake booster 32 while the internal combustion engine 26 is in an automatic stopping state by the S&S control.

The output signal from the negative pressure sensor 52 is supplied to the ECU 50. Based on the output signal from the negative pressure sensor 52, the ECU 50 detects negative pressure Pvac in the negative pressure chamber 34. Then, the ECU 50 uses the detected negative pressure Pvac in the negative pressure chamber 34 for controlling the driving of actuators of the internal combustion engine 26. If the negative pressure Pvac detected while the internal combustion engine 26 is in an automatic stopping state by the S&S control is not maintained to be greater than or equal to a predetermined value, the ECU 50 executes a process to release the automatic stopping, to automatically restart the internal combustion engine 26, and to maintain the negative pressure in the negative pressure chamber 34.

The ECU 50 is connected with a rotational speed sensor 54. The rotational speed sensor 54 outputs a signal depending on the rotational speed of the internal combustion engine 26. The output signal from the rotational speed sensor 54 is supplied to the ECU 50. Based on the output signal form the rotational speed sensor 54, the ECU 50 detects the rotational speed NE of the internal combustion engine 26. Then, the ECU 50 uses the detected rotational speed NE of the internal combustion engine 26 for controlling the driving of actuators of the internal combustion engine 26.

The ECU 50 is connected with a master pressure sensor 56. The master pressure sensor 56 is disposed in a hydraulic pressure chamber of the master cylinder 44. The master pressure sensor 56 outputs a signal that depends on pressure generated in the hydraulic pressure chamber of the master cylinder 44. The output signal from the master pressure sensor 56 is supplied to the ECU 50. The ECU 50 detects pressure in the hydraulic pressure chamber of the master cylinder 44 (referred to as "master pressure" below) Pm based on the output signal from the master pressure sensor 56.

The ECU 50 is connected with a stop lamp switch 58. The stop lamp switch 58 is a switch that is turned on and off depending on a braking operation on the brake pedal 30 by the driver. The stop lamp switch 58 is turned on when a pedaling operation is made on the brake pedal 30 in a release state, and turned off when the pedaling operation is released. The ECU 50 detects the state of the stop lamp switch 58.

The ECU 50 is connected with a display lamp (MIL) 60 that is disposed in a meter visible from the driver. As described above, based on the detected negative pressure Pvac in the negative pressure chamber 34, the ECU 50 determines whether the negative pressure sensor 52 is in an abnormal state (especially an abnormal state due to deviation such as a gain shift or an offset shift), as will be described in detail later. If the ECU 50 determines that the negative pressure sensor 52 is in an abnormal state, the ECU 50 inhibits automatic stopping of the internal combustion engine 26 by the S&S control, stores the abnormal state of the negative pressure sensor 52 in a diagnostic memory, and has the MIL 60 lit to display an indication of the abnormality in the negative pressure sensor 52, or the automatic stopping inhibition of the internal combustion engine 26.

Figure 3:
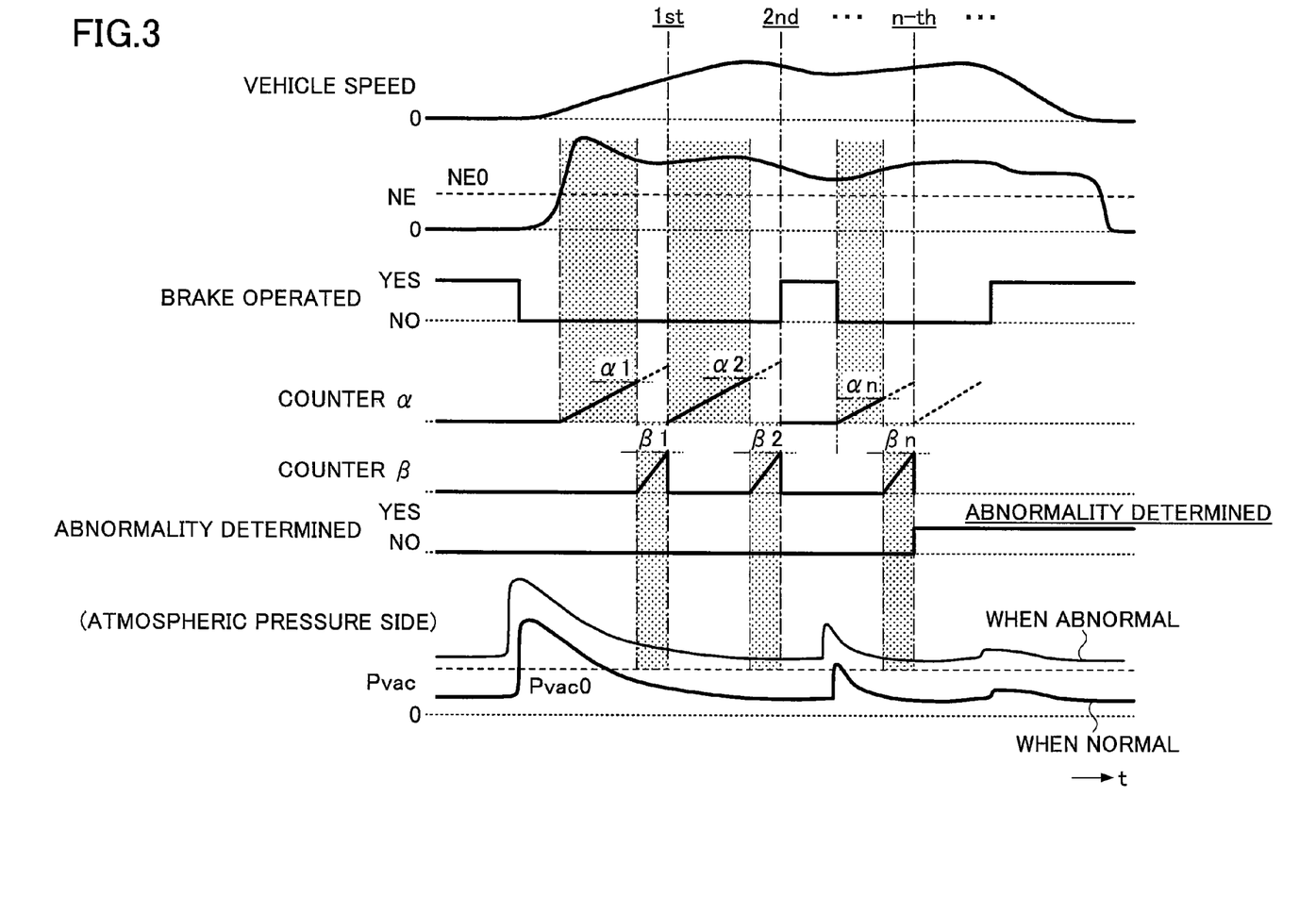
FIG. 3 is an operational timing chart of an example implemented in a vehicle control apparatus according to the embodiment.
Figure 4:
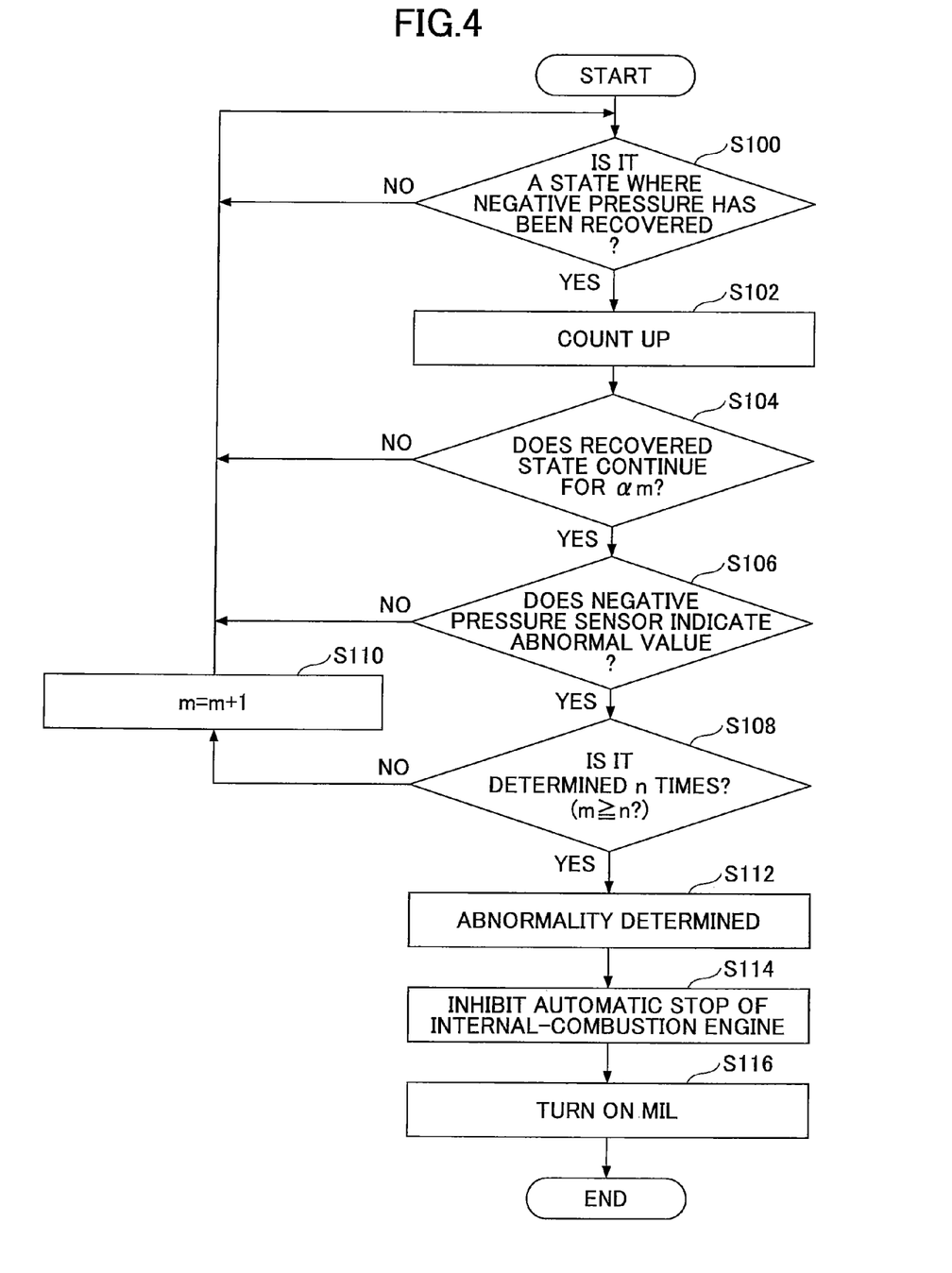
FIG. 4 is a flowchart of an example of a control routine executed in a vehicle control apparatus according to the embodiment.

FIG. 3 is an operational timing chart of an example implemented in the vehicle control apparatus 22 of the vehicle 20 according to the present embodiment. Also, FIG. 4 is a flowchart of an example of a control routine executed in the vehicle control apparatus 22 of the vehicle 20, to determine whether an abnormality occurs in the negative pressure sensor 52 according to the present embodiment.

In the brake system 24 in the present embodiment, when a pedaling operation is released in a state where the brake pedal 30 has been under the pedaling operation, namely, a brake relaxing operation is performed, the atmosphere is introduced into the negative pressure chamber 34 of the brake booster 32, and consequently, the negative pressure in the negative pressure chamber 34 steeply reduces to the atmospheric pressure side. Also, when a brake relaxing operation on the brake pedal 30 is performed during the automatic stopping of the internal combustion engine 26 by the S&S control, the predetermined restart condition is satisfied to automatically start the internal combustion engine 26, and consequently, the rotation of the internal combustion engine 26 increases, following behind the negative pressure reduction of the negative pressure chamber 34. While the internal combustion engine 26 rotates, as long as no braking operation on the brake pedal 30 is performed, the negative pressure in the negative pressure chamber 34 gradually rises from the atmospheric pressure side to zero [kPa], by the operation of the linear-motion negative pressure pump 40.

In the control apparatus 22 in the present embodiment, when determining whether an abnormality occurs in the negative pressure sensor 52, the ECU 50 excludes a timing when the negative pressure in the negative pressure chamber 34 of the brake booster 32 is dissipated by a braking operation on the brake pedal 30. Specifically, first, the ECU 50 determines whether it is in a state (negative pressure recovered state) where the negative pressure in the negative pressure chamber 34 of the brake booster 32 is recovered up to a value close to zero [kPa] (vacuum pressure), for every predetermined period (Step S100).

The determination at Step S100 is specifically executed, for example, based on determining whether the driver performs a braking operation on the brake pedal 30, by reading the state of the stop lamp switch 58, and determining whether the rotational speed NE of the internal combustion engine 26 has been greater than or equal to a predetermined threshold NE0, by reading the rotational speed NE of the internal combustion engine 26 based on the output signal from the rotational speed sensor 54. A positive determination may be obtained when a braking operation on the brake pedal 30 is not performed, and the rotational speed NE of the internal combustion engine 26 has been greater than or equal to the predetermined threshold NE0.

The ECU 50 repeatedly executes Step S100 if determining that the negative pressure is not in the recovered state at Step S100. On the other hand, if determining that the negative pressure is in a recovered state, then, the ECU 50 counts up a counter indicating that the negative pressure is in a recovered state (Step S102). Then, based on the count value of the counted-up counter, the ECU 50 determines whether the recovered state of the negative pressure has continued for a predetermined time $\alpha m$ (where a value m is the number of times that the negative pressure sensor 52 is temporarily determined to be in an abnormal state, which is an integer greater than or equal to 0, as will be described later) (Step S104).

Note that the predetermined threshold NE0 and the predetermined time $\alpha m$ may be set to respective values with which the negative pressure is generated in the negative pressure chamber 34 of the brake booster 32 that is greater than or equal to a predetermined level (specifically, in the neighborhood of zero [kPa]) by the operation of the linear-motion negative pressure pump 40.

Also, an initial value $\alpha 0$ of the predetermined time $\alpha m$ is a time specified in advance depending on negative pressure recovery capability of the linear-motion negative pressure pump 40. Also, the predetermined time $\alpha m$ ($m \geq 1$) is a value that is changed in the ECU 50, depending on whether the negative pressure recovered state has continued without consuming the negative pressure after the negative pressure has been determined as recovered for the previous time, namely, depending on whether the negative pressure recovered state has continued since the previous time during which the braking operation on the brake pedal 30 has not been performed, and the rotational speed NE of the internal combustion engine 26 has been greater than or equal to the predetermined threshold NE0. Specifically, the predetermined time $\alpha m$ ($m \geq 1$) is set shorter when the negative pressure recovered state has continued since the previous determination of the negative pressure recovered state, than when the negative pressure has been dissipated and the negative pressure recovered state has not continued since the previous determination of the negative pressure recovered state.

Also, if the negative pressure recovered state has continued since the previous determination of the negative pressure recovered state, during which a braking operation on the brake pedal 30 has not been performed, and the rotational speed NE of the internal combustion engine 26 has been greater than or equal to the predetermined threshold NE0, then, the predetermined time $\alpha m$ ($m \geq 1$) may be set shorter compared to the predetermined time $\alpha(m-1)$ used for the previous time, or may be the same as the predetermined time $\alpha(m-1)$ used for the previous time. Also, if the state has not continued since the previous time, the predetermined time $\alpha m$ ($m \geq 1$) may be the same as the predetermined time $\alpha(m-1)$ used for the previous time, or may be set longer compared to the predetermined time $\alpha(m-1)$ used for the previous time.

If determining that the negative pressure has not continued to be in the recovered state for the predetermined time $\alpha m$ or longer, the ECU 50 repeatedly executes Step S100. On the other hand, if determining that the negative pressure has continued to be in the recovered state for the predetermined time $\alpha m$ or longer, then, the ECU 50 temporarily determines whether the negative pressure sensor 52 is in an abnormal state, by reading the negative pressure Pvac generated in the negative pressure chamber 34 of the brake booster 32, based on the output signal from the negative pressure sensor 52, and by determining whether the negative pressure Pvac is in the abnormal range (Step S106).

The abnormal range of the negative pressure Pvac is, for example, a range of the negative pressure on the atmospheric pressure side relative to the predetermined negative pressure Pvac0. The temporary determination at Step S106 may be positive, for example, if the negative pressure Pvac in the negative pressure chamber 34 takes a value on the atmospheric pressure side relative to the predetermined negative pressure Pvac0. Also, the predetermined negative pressure Pvac0 may be set to a minimum value of the negative pressure that is possibly taken when the negative pressure sensor 52 is in a normal state if a state has continued for the predetermined time $\alpha m$ or longer during which a braking operation on the brake pedal 30 has not been performed, and the rotational speed NE of the internal combustion engine 26 has been greater than or equal to the predetermined threshold NE0.

Also, the temporary determination at Step S106 may be positive if a state has continued for a predetermined time $\beta m$ or longer during which the negative pressure Pvac is in the abnormal range. This predetermined time $\beta m$ is provided for excluding a wrong determination in which the negative pressure Pvac is determined to be in the abnormal range due to noise or the like even if the negative pressure sensor 52 is actually in a normal state, and may be set to a predetermined time.

Note that this predetermined time $\beta m$ may be set to zero. Also, in a configuration where this predetermined time $\beta m$ is set greater than zero, measurement of time during which the negative pressure has continued to be in a recovered state, which is executed in every abnormality determination, may be suspended while time is measured for a state during which the negative pressure Pvac has continued to be in the abnormal range (see FIG. 3). Alternatively, the measurement may be continued while time is measured for the state during which the negative pressure Pvac has continued to be in the abnormal range (however, in this case, $\beta m < \alpha(m+1)$ needs to be satisfied).

If temporarily determining at Step S106 that the negative pressure sensor 52 is not in an abnormal state because the negative pressure Pvac is not in the abnormal range, the ECU 50 repeatedly executes Step S100. On the other hand, if temporarily determining that the negative pressure sensor 52 is in an abnormal state because the negative pressure Pvac is in the abnormal range at Step S106, then, the ECU 50 determines whether the temporary determination has been executed for a predetermined number of times n, having determined that the negative pressure sensor 52 is in an abnormal state, including the latest temporary determination (Step S108).

Note that the predetermined number of times n is set in advance, greater than or equal to two, for example, three or five. Also, the number of times of positive temporary determinations m for counting that the negative pressure sensor 52 is in an abnormal state, is a value that is maintained without being reset to zero even if a negative pressure recovered state has not continued while the determination has been executed for the predetermined number of times n since the temporary determination has been executed for the first time that the negative pressure sensor 52 is in an abnormal state at Step S108, namely, a braking operation on the brake pedal 30 has been performed or the rotational speed NE of the internal combustion engine 26 has become less than the predetermined threshold NE0.

If determining at Step S108 that the number of times of positive temporary determinations m, in which the negative pressure sensor 52 is temporarily determined to be in an abnormal state, is less than the predetermined number of n, then, the ECU 50 increments the number of m by 1 for the temporary determination that the negative pressure sensor 52 is in an abnormal state (Step S110), and after that, repeatedly executes Step S100. On the other hand, if determining at Step S108 that the number of times of temporary determinations m, in which the negative pressure sensor 52 is temporarily determined to be in an abnormal state, is greater than or equal to the predetermined number of n, then, the ECU 50 certainly determines that the negative pressure sensor 52 is in an abnormal state (Step S112).

If certainly determining at Step S112 that the negative pressure sensor 52 is in an abnormal state, then, the ECU 50 inhibits automatic stopping of the internal combustion engine 26 by the S&S control (Step S114), stores the abnormal state of the negative pressure sensor 52 in the diagnostic memory, and has the MIL 60 lit to display an indication of the abnormality of the negative pressure sensor 52 or the automatic stopping inhibition of the internal combustion engine 26, to the driver (Step S116). Note that inhibition of automatic stopping of the internal combustion engine 26 accompanying an abnormality determination of the negative pressure sensor 52, includes automatically starting the internal combustion engine 26 if the negative pressure sensor 52 has been determined to be in an abnormal state during the automatic stopping of the internal combustion engine 26.

Note that having certainly determined that the negative pressure sensor 52 is in an abnormal state, or having inhibited the automatic stopping of the internal combustion engine 26 by the S&S control, if the negative pressure Pvac is contained within the normal range, the ECU 50 determines that the negative pressure sensor 52 is in a normal state, to release the automatic stopping of the internal combustion engine 26 by the S&S control, and may have the MIL 60 turn off the light to release the indication of the abnormality of the negative pressure sensor 52 or the automatic stopping inhibition of the internal combustion engine 26, to the driver.

In this way, the control apparatus 22 of the vehicle 20 in the present embodiment, which executes the S&S control, can temporarily determine whether the negative pressure sensor 52 is in an abnormal state, at a timing after a state has continued for the predetermined time $\alpha m$ or longer during which a braking operation on the brake pedal 30 has not been performed, and the rotational speed NE of the internal combustion engine 26 has been greater than or equal to the predetermined threshold NE0, based on the negative pressure Pvac in the negative pressure chamber 34 detected based on the output signal from the negative pressure sensor 52. Then, having temporarily determined that the negative pressure sensor 52 is in an abnormal state, and then, having executed the same temporary determinations for the predetermined number of times n, the control apparatus 22 can certainly determine that the negative pressure sensor 52 is in an abnormal state.

At a timing after a state has continued for the predetermined time $\alpha m$ or longer during which a braking operation on the brake pedal 30 has not been performed, and the rotational speed NE of the internal combustion engine 26 has been greater than or equal to the predetermined threshold NE0, if the negative pressure sensor 52 is in a normal state, the negative pressure Pvac in the negative pressure chamber 34 detected by using the negative pressure sensor 52 takes a value on the pressure zero [kPa] side relative to the predetermined negative pressure Pvac0. On the other hand, if an abnormality due to a deviation occurs in the negative pressure sensor 52 at the timing, the negative pressure Pvac in the negative pressure chamber 34 detected by using the negative pressure sensor 52 takes a value on the atmospheric pressure side relative to the predetermined negative pressure Pvac0.

Thus, the control apparatus 22 in the present embodiment can more accurately determine whether an abnormality occurs in the negative pressure sensor 52, including an abnormality due to a deviation, by comparing the negative pressure Pvac in the negative pressure chamber 34 detected by using the negative pressure sensor 52 at the timing, with the predetermined negative pressure Pvac0. Also, the control apparatus 22 certainly determines that the negative pressure sensor 52 is in an abnormal state after having executed the temporary determinations for the predetermined number of times n, and hence, an abnormally in the negative pressure sensor 52 can be precisely determined.

Also, in the present embodiment, the predetermined time $\alpha m$ (m≥1) can be changed depending whether the negative pressure recovered state has continued since the previous determination. As described above, the predetermined time $\alpha m$ is used for setting a timing to compare the negative pressure Pvac in the negative pressure chamber 34 detected by using the negative pressure sensor 52, with the predetermined negative pressure Pvac0 (namely, the timing for temporarily determining whether an abnormality occurs in the negative pressure sensor 52). The comparison is made after a state has continued for the predetermined time $\alpha m$ during which a braking operation has not been performed on the brake pedal 30, and the rotational speed NE of the internal combustion engine 26 has been greater than or equal to the predetermined threshold NE0. Specifically, the predetermined time $\alpha m$ (m≥1) is set shorter when the negative pressure recovered state has continued since the previous determination, than when the negative pressure recovered state has not continued.

If the negative pressure recovered state has not continued during which a braking operation has not been performed on the brake pedal 30 and the rotational speed NE of the internal combustion engine 26 has been greater than or equal to the predetermined threshold NE0, it can be determined that the negative pressure in the negative pressure chamber 34 of the brake booster 32 has been dissipated. On the other hand, if the negative pressure recovered state has continued, it can be determined that the negative pressure in the negative pressure chamber 34 of the brake booster 32 has not been dissipated.

Therefore, when the negative pressure recovered state has continued since the previous determination, even if the predetermined time $\alpha m$ ($m \geq 1$) is set shorter than when the negative pressure recovered state has not continued, it is possible to sufficiently maintain the negative pressure in the negative pressure chamber 34 while the negative pressure recovered state has continued for the predetermined time $\alpha m$, and it is possible to temporarily determine whether an abnormality occurs in the negative pressure sensor 52 precisely. Also, when the negative pressure recovered state has not continued since the previous determination, by setting the predetermined time $\alpha m$ ($m \geq 1$) longer compared when the negative pressure recovered state has continued, it is possible to sufficiently maintain the negative pressure in the negative pressure chamber 34 while the negative pressure recovered state has continued for the predetermined time $\alpha m$, and it is possible to temporarily determine whether an abnormality occurs in the negative pressure sensor 52 precisely.

Also, by setting the predetermined time $\alpha m$ ($m \geq 1$) shorter, it is possible to temporarily determine whether the negative pressure sensor 52 is in an abnormal state within a short time since the previous temporary determination. Therefore, by setting the predetermined time $\alpha m$ ($m \geq 1$) shorter when the negative pressure recovered state has continued since the previous determination, than when the negative pressure recovered state has not continued, the control apparatus 22 in the present embodiment can certainly determine that an abnormality occurs in the negative pressure sensor 52 as early as possible.

Also, in the present embodiment, the predetermined time $\alpha m$ may be set shorter than the predetermined time $\alpha(m-1)$ used for the previous time, when the negative pressure recovered state, in which a braking operation on the brake pedal 30 has not been performed and the rotational speed NE of the internal combustion engine 26 has been greater than or equal to the predetermined threshold NE0, has continued since the previous determination of the negative pressure recovered state. When the negative pressure recovered state has continued since the previous determination, it can be determined that the negative pressure in the negative pressure chamber 34 of the brake booster 32 has not been dissipated, and is sufficiently maintained. Therefore, by setting the predetermined time $\alpha m$ ($m \geq 1$) shorter when the negative pressure recovered state has continued since the previous determination, it is possible to certainly determine that an abnormality occurs in the negative pressure sensor 52 even earlier.

Also, in the present embodiment, the predetermined time $\alpha m$ may be set longer than the predetermined time $\alpha(m-1)$ used for the previous time, when the negative pressure recovered state has not continued since the previous determination of the negative pressure recovered state. When the negative pressure recovered state has not continued since the previous determination of the negative pressure recovered state, the negative pressure in the negative pressure chamber 34 of the brake booster 32 may have been dissipated, and may not be sufficiently maintained. Therefore, by setting the predetermined time $\alpha m$ ($m \geq 1$) longer when the negative pressure recovered state has not continued since the previous determination of the negative pressure recovered state, it is possible to sufficiently maintain the negative pressure in the negative pressure chamber 34.

In the present embodiment, when the negative pressure sensor 52 is certainly determined to be in an abnormal state as described above, then, automatic stopping of the internal combustion engine 26 by the S&S control is inhibited.

Therefore, according to the present embodiment, when an abnormality due to a deviation occurs in the negative pressure sensor 52, it is possible to prevent the internal combustion engine 26 from being automatically stopped by the S&S control, or from being kept in an automatically stopped state. Therefore, it is always possible to sufficiently maintain the negative pressure in the negative pressure chamber 34 when an abnormality due to a deviation occurs in the negative pressure sensor 52.

Also, in the present embodiment, when the negative pressure sensor 52 is determined to be in an abnormal state as described above, the abnormality of the negative pressure sensor 52 is stored in the diagnostic memory. Therefore, according to the present embodiment, after an abnormality due to a deviation has occured in the negative pressure sensor 52, it is possible for a vehicle dealer or the like to easily identify the abnormal location of the vehicle 20.

Furthermore, when the negative pressure sensor 52 is determined to be in an abnormal state as described above, then, the MIL 60 is lit to display an indication of the abnormality in the negative pressure sensor 52 or the automatic stopping inhibition of the internal combustion engine 26. Therefore, according to the present embodiment, when an abnormality due to a deviation occurs in the negative pressure sensor 52, the abnormality due to a deviation in the negative pressure sensor 52 or the automatic stopping inhibition of the internal combustion engine 26 is promptly indicated to the driver by the MIL 60. Therefore, it is possible to prompt the driver to replace or repair the negative pressure sensor 52 having the abnormality due to a deviation.

Note that, in the above embodiments, the brake booster 32 corresponds to a "braking operation assist unit" described in the claims; the predetermined stopping condition corresponds to a "first condition" described in the claims; the predetermined restart condition corresponds to a "second condition" described in the claims; the ECU 50 executing the S&S control corresponds to an "automatic stop and start unit" described in the claims; the ECU 50 detecting the state of the stop lamp switch 58 to determine whether a braking operation on the brake pedal 30 is performed by the driver, corresponds to a "braking operation detection unit" described in the claims; the ECU 50 detecting the rotational speed NE of the internal combustion engine 26 based on the output signal from the rotational speed sensor 54, corresponds to a "rotational speed detection unit" described in the claims; the ECU 50 detecting the negative pressure Pvac generated in the negative pressure chamber 34 of the brake booster 32 based on the output signal from the negative pressure sensor 52, corresponds to a "negative pressure detection unit" described in the claims; the ECU 50 executing Step S106 in the routine illustrated in FIG. 4, corresponds to a "temporary determination unit" described in the claims; the ECU 50 executing Step S112 corresponds to an "abnormality determination unit" described in the claims; the ECU 50 executing Step S114 corresponds to an "automatic stopping inhibition unit" described in the claims; and the ECU 50 changing the predetermined time $\alpha m$ depending whether a state has continued since the previous time during which a braking operation on the brake pedal 30 has not been performed, and the rotational speed NE of the internal combustion engine 26 has been greater than or equal to the predetermined threshold NE0, corresponds to a "time change unit" described in the claims.

Incidentally, in the above embodiments, the predetermined threshold NE0 for the rotational speed NE of the internal combustion engine 26 and the predetermined time αm are used for temporarily determining whether the internal combustion engine 26 is in an abnormal state. Alternatively, since capability for generating negative pressure by the linear-motion negative pressure pump 40 may change depending on the rotational speed NE of the internal combustion engine 26, the operational amount of the brake pedal 30, atmospheric pressure, time after the ignition has been turned on, and the like, the predetermined time αm may be changed depending on the rotational speed NE of the internal combustion engine 26, the operational amount of the brake pedal 30, atmospheric pressure, time after turning on the ignition, and the like, while the predetermined threshold NE0 is set to a fixed value. According to such a modified embodiment, even if the capability for generating negative pressure of the linear-motion negative pressure pump 40 changes, detection of the negative pressure Pvac, which is used as a parameter to temporarily determine whether the negative pressure sensor 52 is in an abnormal state, can always be started at a timing when the negative pressure generated in the negative pressure chamber 34 has just reached about zero [kPa]. Therefore, it is possible to temporarily determine whether the negative pressure sensor 52 is in an abnormal state precisely.

Also, in the above embodiments, whether the driver performs a braking operation on the brake pedal 30 is determined based on whether the stop lamp switch 58 is in an off state. However, the present invention is not limited to this, but this determination may be executed based on whether the master pressure Pm is less than a predetermined value Pm0.

Also, the determination may be executed based on whether the absolute value of a pressure difference of the master pressure Pm between a value at a timing when the internal combustion engine 26 starts rotating, and a value at a timing when the negative pressure Pvac is detected by using the negative pressure sensor 52, is less than a predetermined value. In this case, a positive determination is made if the absolute value of the pressure difference is less than the predetermined value. Note that, in this modified embodiment, the predetermined value of the absolute value of the pressure difference may be set to a maximum value of the pressure difference with which a braking operation on the brake pedal 30 is determined as not being performed.

Also, the determination may be executed based on whether a pressure difference of the master pressure Pm obtained by subtracting a value at a timing when the negative pressure Pvac is detected by using the negative pressure sensor 52, from a value at a timing when the internal combustion engine 26 starts rotating, is greater than or equal to zero, and less than a predetermined value. In this case, a positive determination is made if the pressure difference is greater than or equal to zero, and less than the predetermined value. Note that, in this modified embodiment, the predetermined value of the pressure difference may be set to a maximum value of the pressure difference with which a braking operation on the brake pedal 30 is determined as not being performed.

Also, the determination may be executed based on whether the pressure difference of the master pressure Pm obtained by subtracting a value at a timing when the negative pressure Pvac is detected by using the negative pressure sensor 52, from a value at a timing when the internal combustion engine 26 starts rotating, is greater than or equal to a predetermined value, or whether the stop lamp switch 58 is switched from an on state to an off state. In this case, a positive determination is made if the pressure difference is greater than or equal to the predetermined value, or the stop lamp switch 58 is switched from an on state to an off state.

In the above embodiments, the linear-motion negative pressure pump 40 is provided in the brake system 24 to operate depending on rotation of the internal combustion engine 26, and the ECU 50 determines whether the rotational condition of the internal combustion engine 26 is satisfied at Step S106. However, the present invention is not limited to this, but can be applied to a brake system 24 not having the linear-motion negative pressure pump 40. In such a brake system 24 not having the linear-motion negative pressure pump 40, a timing when a sufficient negative pressure is generated in the negative pressure chamber 34, not only depends on the rotation of the internal combustion engine 26, but also depends on the opening of a throttle of the internal combustion engine 26. Thereupon, the ECU 50 may determine whether the rotational condition of the internal combustion engine 26 is satisfied as follows.

At a timing when a state has continued for a predetermined time or longer during which a brake relaxing operation on the brake pedal 30 has not been performed, the rotational speed NE has been greater than or equal to a predetermined threshold of the internal combustion engine 26, and the throttle opening has been less than or equal to a predetermined opening for a predetermined time or longer, so-called "pumping loss" is sufficiently generated, and a sufficient negative pressure is generated in the negative pressure chamber 34 of the brake booster 32. Therefore, even if a brake system 24 is configured without the linear-motion negative pressure pump 40 as in this modified embodiment, based on the negative pressure Pvac in the negative pressure chamber 34 detected at the timing based on the output signal from the negative pressure sensor 52, it is possible to temporarily determine whether an abnormality occurs in the negative pressure sensor 52, and substantially the same effect can be obtained as in the above embodiments.

Also, in the above embodiments, whether the negative pressure sensor 52 is in an abnormal state is temporarily determined, and certainly determined. However, the present invention is not limited to this, but in addition to the temporary determination and sure determination of the abnormal state, the negative pressure sensor 52 may be temporarily determined and certainly determined whether it is in a normal state. In such a modified embodiment, if a temporary determination for a normal state, and a temporary determination for an abnormal state occur alternately, the number of temporary determinations may be reset to improve determination precision or to avoid an erroneous determination.

Also, in a configuration in which the negative pressure sensor 52 is temporarily determined and certainly determined whether it is in a normal state, if the negative pressure sensor 52 has been determined to be in an abnormal state, and after that, the negative pressure sensor 52 is determined to be in a normal state, inhibition of the automatic stopping of the internal combustion engine 26 by the S&S control may be released, and the light of the MIL 60 may be turned off. According to the modified embodiment, when the negative pressure sensor 52 returns to a normal state from an abnormal state, the automatic stopping of the internal combustion engine 26 by the S&S control is allowed. This improves the fuel efficiency, and unnecessary replacement and repair of the negative pressure sensor 52 can be avoided.

Also, in the above embodiments, whether the negative pressure sensor 52 is in an abnormal state, is temporarily determined based on whether the detected negative pressure Pvac in the negative pressure chamber 34 is greater than or equal to the predetermined negative pressure Pvac0. This predetermined negative pressure Pvac0 may be a fixed value. Also, the capability for generating negative pressure due to the rotation of the internal combustion engine may change depending on atmospheric pressure in an environment where the vehicle is located, and a negative pressure value required for securing a brake force during the automatic stopping of the internal combustion engine 26 by the S&S control. Therefore, the predetermined negative pressure Pvac0 may be changed depending on the atmospheric pressure and the required negative pressure. According to this modified embodiment, temporarily determining and certainly determining whether the negative pressure sensor 52 is in an abnormal state can be executed precisely, and consequently, the automatic stopping of the internal combustion engine 26 by the S&S control can be inhibited precisely.

For example, when setting the predetermined negative pressure Pvac0, the ECU 50 first calculates the atmospheric pressure, and calculates the negative pressure required for securing the brake force to make the vehicle stop during the automatic stopping of the internal combustion engine 26 by the S&S control. Then, based on the calculated atmospheric pressure, the required negative pressure, and an error difference margin to absorb error differences of a characteristic variation specified in advance for negative pressure sensors 52, the ECU 50 sets the predetermined negative pressure Pvac0 to a value obtained by subtracting the required negative pressure and the error difference margin from the atmospheric pressure (Pvac0=atmospheric pressure−required negative pressure−error difference margin). Using the predetermined negative pressure Pvac0 having been set as above, the ECU 50 executes Step S106.

Note that a fixed value specified in advance may be used as the atmospheric pressure. Also, while using the atmospheric pressure set to a fixed value for a specific altitude specified in advance, the fixed value for the altitude may be corrected based on atmospheric pressure information, temperature information, and the like. Furthermore, the atmospheric pressure may be calculated based on altitude information, atmospheric pressure information, temperature information and the like in a place where the vehicle 20 is currently located.

Also, a fixed value specified in advance may be used as the required negative pressure. Also, the required negative pressure may be calculated using a negative pressure value required for braking the vehicle 20 calculated based on a state of the vehicle 20 and a peripheral environment (for example, the slope of the road surface), or a negative pressure value required for braking the vehicle 20 calculated based on characteristics of the vehicle 20 (for example, the vehicle weight, the vehicle grade, the displacement of the built-in engine, and the built-in brake system).

Furthermore, in the above embodiments, the MIL 60, which is a display lamp disposed in a meter, is used as a unit to indicate an abnormality in the negative pressure sensor 52 or automatic stopping inhibition of the internal combustion engine 26 to the driver. However, the present invention is not limited to this, but another display unit may be used, or an audible unit may be used instead of, or in addition to a visible unit.

The present application is based on Japanese Priority Application No. 2014-120864, filed on Jun. 11, 2014, the entire contents of which are hereby incorporated by reference.

The invention claimed is:

1. A vehicle control apparatus including a negative pressure chamber in which a negative pressure is generated depending on rotation of an internal combustion engine,
 a braking operation assist unit configured to assist a braking operation of a driver by using the negative pressure in the negative pressure chamber, and
 an automatic stop and start unit configured to have the internal combustion engine automatically stop when a first condition is satisfied, and after the automatic stopping, to have the internal combustion engine automatically start when a second condition is satisfied,
 comprising:
 a braking operation detection unit configured to determine whether a braking operation of the vehicle driver is not performed;
 a rotational speed detection unit configured to detect a rotational speed of the internal combustion engine;
 a negative pressure detection unit configured to detect the negative pressure in the negative pressure chamber, based on an output signal from a negative pressure sensor outputting a signal depending on the negative pressure generated in the negative pressure chamber;
 a temporary determination unit configured to temporarily determine whether the negative pressure sensor is in an abnormal state, based on the negative pressure in the negative pressure chamber detected by the negative pressure detection unit, when a state has continued for a predetermined time or longer during which the braking operation has not been detected by the braking operation detection unit, and the rotational speed of the internal combustion engine detected by the rotational speed detection unit has been greater than or equal to a threshold;
 an abnormality determination unit configured to certainly determine that the negative pressure sensor is in the abnormal state when the negative pressure sensor has been temporarily determined to be in the abnormal state by the temporary determination unit for a predetermined number of times;
 an automatic stopping inhibition unit configured to inhibit the automatic stopping of the internal combustion engine by the automatic stop and start unit when the negative pressure sensor is determined to be in the abnormal state by the abnormality determination unit; and
 a time change unit configured, after the negative pressure sensor has been temporarily determined to be in the abnormal state by the temporary determination unit, to change the predetermined time for a next time used for temporarily determining whether the negative pressure sensor is in an abnormal state by the temporary determination unit, depending on whether the state has continued.

2. The vehicle control apparatus, as claimed in claim 1, wherein after the negative pressure sensor has been temporarily determined to be in the abnormal state by the temporary determination unit, if the state has continued, the time change unit changes the predetermined time shorter for the next time used for temporarily determining whether the negative pressure sensor is in an abnormal state by the temporary determination unit, compared to a case where the state has not continued.

3. The vehicle control apparatus, as claimed in claim 1, wherein after the negative pressure sensor has been temporarily determined to be in the abnormal state by the temporary determination unit, if the state has continued, the time change unit changes the predetermined time shorter for the next time used for temporarily determining whether the negative pressure sensor is in an abnormal state by the temporary determination unit, compared to the predetermined time used for a previous time.

4. The vehicle control apparatus, as claimed in claim 3, wherein after the negative pressure sensor has been temporarily determined to be in the abnormal state by the temporary determination unit, if the state has not continued, the time change unit changes the predetermined time longer for the next time used for temporarily determining whether the negative pressure sensor is in an abnormal state by the temporary determination unit, compared to the predetermined time used for the previous time.

5. The vehicle control apparatus, as claimed in claim 1, wherein the braking operation is a brake pedaling operation.

6. The vehicle control apparatus, as claimed in claim 1, wherein the braking operation is a brake relaxing operation.

7. The vehicle control apparatus, as claimed in claim 1, wherein after the state has continued for the predetermined time or longer, if a state continues for a threshold time or longer during which the negative pressure in the negative pressure chamber detected by the negative pressure detection unit is shifted on an atmospheric pressure side relative to a predetermined threshold, the temporary determination unit temporarily determines whether the negative pressure sensor is in an abnormal state.

\* \* \* \* \*